T. A. BOWERS.
WIRE WHEEL.
APPLICATION FILED AUG. 26, 1919.
1,347,837.
Patented July 27, 1920.
2 SHEETS—SHEET 1.
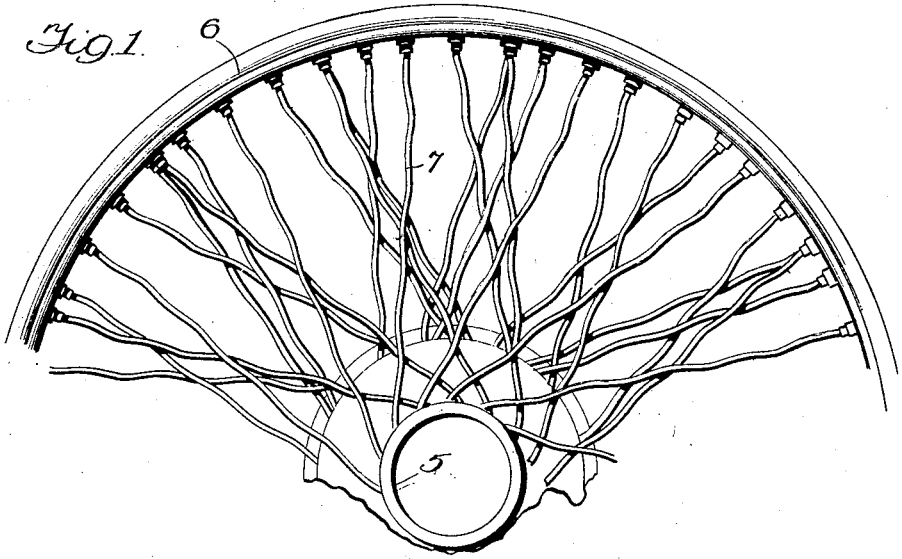
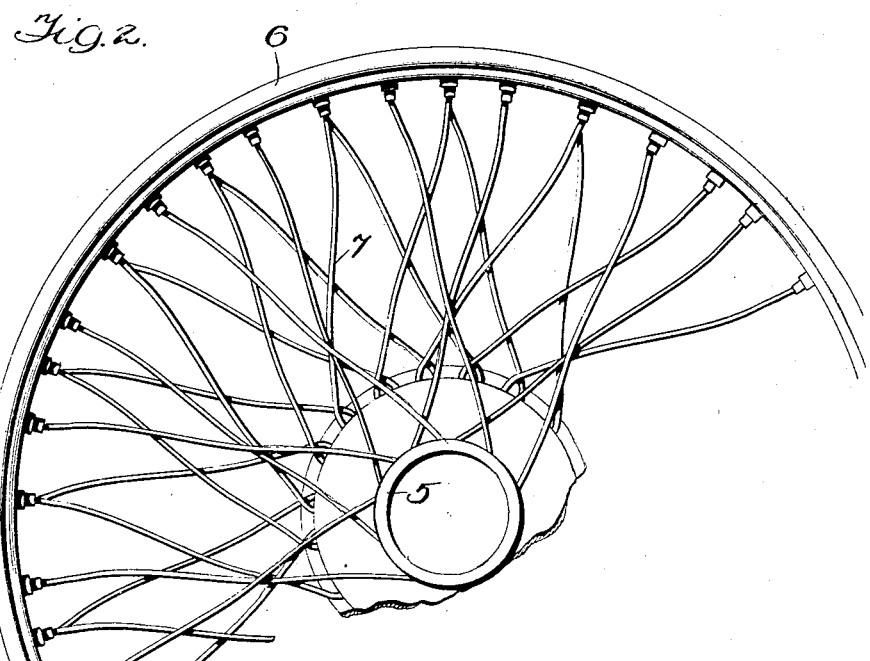
WITNESSES
George A. Myers
INVENTOR
T. A. BOWERS,
BY
ATTORNEYS T. A. BOWERS.
WIRE WHEEL.
APPLICATION FILED AUG. 26, 1919.
1,347,837.
Patented July 27, 1920.
2 SHEETS—SHEET 2.
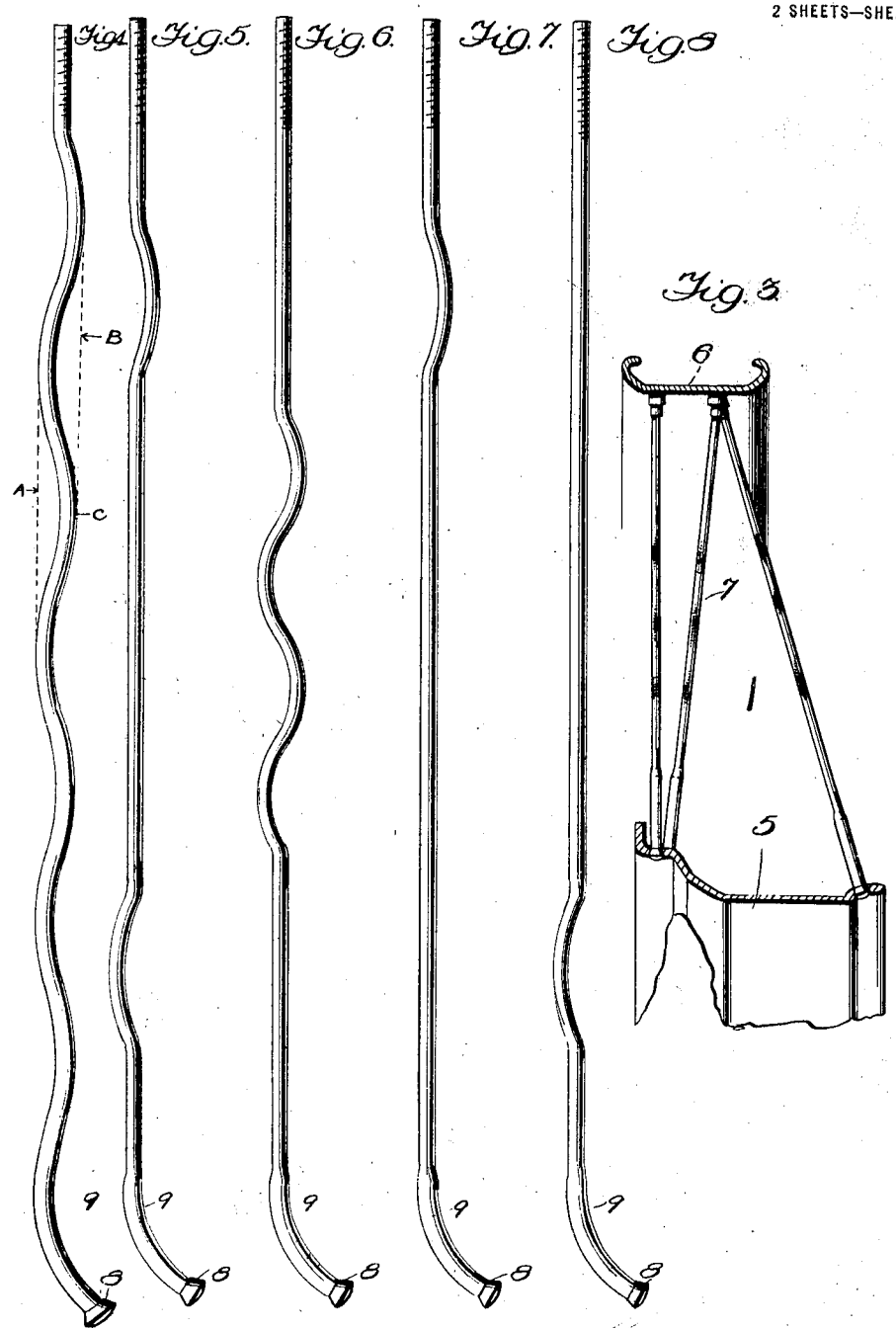
WITNESSES
INVENTOR
T. A. BOWERS,
BY
ATTORNEYS

UNITED STATES PATENT OFFICE.

THOMAS ARCHIBALD BOWERS, OF BROOKLINE, MASSACHUSETTS.

WIRE WHEEL.

1,347,837.          Specification of Letters Patent.      Patented July 27, 1920.

Application filed August 26, 1919. Serial No. 320,027.

*To all whom it may concern:*

Be it known that I, THOMAS A. BOWERS, a citizen of the United States, and a resident of Brookline, in the county of Norfolk and State of Massachusetts, have invented certain new and useful Improvements in Wire Wheels, of which the following is a specification.

This invention is an improvement in vehicle wheels, and more particularly relates to an improvement in wire wheels for automobiles.

One of the principal objects of the invention is to so construct and to mount the wire spokes as to increase the strength and endurance of the wheel and improve the beauty thereof.

Another object is to so temper and crimp the spokes as to materially increase the strength of the wheel, by taking up all internal stresses set up in the spokes under service conditions, and by increasing the tensile strength of the spokes, the purpose being to make the wheel resilient, and to increase its strength and its ability to withstand shocks and strains incident to service conditions.

A further object is to eliminate the disadvantages heretofore accruing to wire wheels by reason of the fact that the spokes become loosened from inability to withstand internal stresses and great loads by reason of the fact that they become permanently elongated under unusual loads, by giving to the spokes such qualities of strength and resistance against strains and stresses as to cause their return to normal position after subjection to unusual loads, and by increasing their ability to withstand unusual internal stresses and strains.

Another object is to crimp the spokes in such a manner as to increase the strength and to so set them with respect to the hub that there will be no decided bend in the spokes, thereby minimizing the danger of the spokes being sheared or broken.

A further object is to crimp and temper the spokes so that they will resist permanent elongation under heavy loads, and so that they will return to their normal position and form subsequently to the removal of loads of unusual weight.

With these and other objects in view, which will become apparent as the description proceeds, the invention resides in the construction, combination and arrangement of parts hereinafter more fully described and claimed, and illustrated in the accompanying drawings in which like characters of reference indicate like parts throughout the several figures, of which:

Figure 1 represents a fragmentary front elevational view of a wheel constructed according to my invention, Fig. 2 is a similar view of a wheel in which the spokes are crimped in a different manner from those shown in Fig. 1, Fig. 3 represents a vertical sectional view through Fig. 1, Figs. 4, 5, 6, 7, and 8 represent plan views of different forms of spokes.

Referring more particularly to the drawing, the hub of the wheel is indicated generally at 5, and the rim thereof at 6. In Figs. 1 and 2 I have shown wheels which are laced in a manner corresponding to the manner in which the well known Rudge-Whitworth and the Houk wheels are laced. This is simply for the purpose of illustration, it being understood that I may lace the spokes of the wheels in various ways.

The spokes 7 are made of suitable lengths of steel wire, which may be spring tempered, by being heated to 1,500° F. approximately, quenched in oil, and drawn at 710° F. approximately. The spokes are crimped after various fashions, the spokes shown in Figs. 1 and 4 being crimped throughout their entire length, the crimps being formed by a multiplicity of reverse curves drawn each on the arc of a circle, the cords of any two adjacent curves being separated a distance preferably not greater than $2\frac{1}{2}$ times the diameter of the spoke, as indicated by the arrows A—B, that is, the center or outermost point of one arc of each curve in the spoke as at C, is not displaced from the axis of the spoke more than a distance equal to $1\frac{1}{4}$ times the diameter of the spoke.

The spokes when laced in place are so arranged that the crimps fall approximately in the plane of the wheel, that is, in a plane at approximately right angles to the axis of the wheel. This arrangement allows of the crimps forming geometric patterns which add in a great degree to the beauty of the wheel, and further allow the spokes which are crossed in lacing the wheel to lie one against the other without danger of any lateral displacement of the crossed spokes one with respect to the other due to the crimps or curved portions working one against the other. If the crimps were arranged in the plane approximately parallel with the axis of the wheel, there would be danger of the crimped portions by engaging each other, offsetting or separating the spokes one with respect to the other.

The inner ends of the spokes are headed as at 8, the head of each spoke being arranged substantially in a plane at right angles to the adjacent curved arch or terminal crimp 9 of the spoke, that is, the plane in which the head 8 lies, extends along the radius of the arc on which the terminating crimp or arch 9 is drawn.

As shown in Fig. 1, the spokes are so set in the hub that the arch or terminating crimp 9 gives the proper inclination or direction of the spoke relatively to the hub, without a decided bend occuring in the spoke. The advantage of this arrangement will be apparent to those skilled in the art, when it is understood that in most instances in broken wire spokes, the break occurs where the head is offset or bent away from the body of the spoke, it having heretofore been the practice to make a relatively sharp bend in the spoke at a point adjacent the head so that the head could properly fit into the hub, and so that the proper inclination of the spoke relative to the hub could be obtained. By gradually arching the spoke toward the head, this disadvantage heretofore accruing in wire spokes is done away with.

The resiliency accruing to the crimped and tempered spokes which are used, makes the wheel resilient, and allows the spokes to take up the internal stresses and strains and sustain a constant resistance thereto, without breaking the spokes and without permanently elongating them.

The action of the crimped and tempered spokes under service conditions, is to distribute the load, being slightly elongated or stretched when the load is excessive, and when relieved of the load to return to their original shape. This quality of the spokes in returning to their normal and original shape, prevents the nipples from becoming loosened. This is a marked advantage over the straight spokes, because of the fact that the latter instead of giving slightly and then resuming their normal shape, either do not give at all, thus tending to loosen the nipples, or else permanently stretch and do not resume their normal shape.

In the form of spoke shown in Fig. 2, the curves along which the crimps are drawn are more gradual than the curves along which the crimps shown in Fig. 1 are drawn. Other forms of spokes are shown in Figs. 5, 6, 7, and 8, the spoke of Fig. 5 being shown with opposed crimps arranged adjacent its ends, the spoke in Fig. 6 showing crimps arranged along the central portion of the spoke, and the spokes shown in Figs. 7 and 8 being crimped at a point adjacent the outer end of the spoke as in Fig. 7, and at a point adjacent the inner end thereof as in Fig. 8. I may, if desired, use other designs, those shown being simply examples of designs which I may use.

I claim:

1. A wheel including a hub and a rim, a plurality of spokes connecting the hub and the rim, each of the spokes being arranged substantially tangentially with respect to the hub, said spokes being crimped along regular reverse curves, the central point of the arc of any one of which is displaced from the axis of the spoke a distance not to exceed one and a quarter times the diameter of the spoke, the spokes being so arranged that they lie substantially in a plane at right angles to the axis of the wheel.

2. A wheel comprising a hub and rim, and spokes, each spoke having a head seated in the hub with a terminal arch having a long radius of curvature, extending from the head to dispose the spoke tangentially in respect to the hub, then continuing in a plurality of crimps in the plane of the terminal arch, all crimps of all spokes lying approximately parallel to the plane of the wheel circumference.

3. A wheel comprising a hub and rim, and spokes, each spoke having a head seated in the hub with a terminal arch extending therefrom on a long curve to prevent crystallization at this point and impart resiliency, and thereafter formed with curves in alternately opposite directions, but all curves being substantially in the plane of the rim circumference.

4. A spoke, having a terminal arch extending therefrom on a curve which is long to avoid a sharp bend and thus prevent crystallization at this point and provided with a head.

5. A crimped-body end-headed spoke, having a terminal arch extending from the spoke in the plane of the crimp to permit forming of the spoke in one machine operation and prevent undue straining of the metal, on a curve which is long to avoid a sharp bend and thus prevent crystallization between the head and spoke body.

6. A crimped-body end-headed heat-tempered wire spoke, having a terminal arch extending from the spoke in the plane of the crimp to permit forming of the spoke in one machine operation and prevent undue straining of the metal, on a curve which is long to avoid a sharp bend and thus prevent crystallization between the head and spoke body.

THOMAS ARCHIBALD BOWERS.